United States Patent [19]

Castellano

[11] Patent Number: 4,877,074
[45] Date of Patent: Oct. 31, 1989

[54] SUN SCREEN FOR VEHICLE
[75] Inventor: Anthony J. Castellano, Elmhurst, Ill.
[73] Assignee: Century Container Corporation, Oak Brook, Ill.
[21] Appl. No.: 306,490
[22] Filed: Feb. 6, 1989
[51] Int. Cl.$^4$ .............................................. E06B 9/24
[52] U.S. Cl. ................................ 160/84.1; 160/370.2; 296/97.8
[58] Field of Search .......................... 160/84.1, 370.2; 296/97.1, 97.8; 229/DIG. 4

[56] References Cited
U.S. PATENT DOCUMENTS

| | | |
|---|---|---|
| 1,421,716 | 7/1922 | Randall . |
| 1,987,259 | 1/1935 | Koehler . |
| 2,305,677 | 12/1942 | Cotton . |
| 2,546,438 | 3/1951 | Grabill . |
| 2,560,762 | 7/1951 | Ghegan . |
| 2,651,543 | 9/1953 | Chonoski et al. . |
| 2,715,042 | 8/1955 | Lancaster . |
| 2,804,135 | 8/1957 | Sutton . |
| 2,806,809 | 9/1957 | Schuh . |
| 2,855,241 | 10/1958 | Walter . |
| 3,003,812 | 10/1961 | Haugland . |
| 4,202,396 | 5/1980 | Levy . |
| 4,210,241 | 7/1980 | Morcom ..................... 229/DIG. 4 |
| 4,671,334 | 6/1987 | Yadegar et al. ................. 160/84.1 |
| 4,727,920 | 3/1988 | Siegler . |
| 4,805,955 | 2/1989 | Levy ............................... 160/84.1 |

Primary Examiner—Blair M. Johnson
Attorney, Agent, or Firm—Emrich & Dithmar

[57] ABSTRACT

A sun screen includes a plurality of sections adapted to assume a generally planar configuration when extended and a compact configuration when folded in an accordion-like manner. Adjacent sections are coupled in a hinge-like manner by linear arrays of perforations to facilitate folding of the sun screen, which may then be retained in the folded configuration by an elastic strap disposed thereabout. An upper, median portion of the sun screen includes a narrow slot extending downward from an upper edge along the center, linear array of perforations and terminates in a circular aperture. A second plurality of linear arrays of perforations are disposed radially about an upper portion of the aperture, terminating in the upper edge of the sun screen. The circular aperture is adapted to receive a rearview mirror support member mounted on or adjacent to the windshield by inserting the mirror support through the aforementioned slot. The radial perforations allow the sun screen adjacent to the aperture to flex for insertion of the mirror support through the slot and into the aperture, then allowing the sun screen to assume its generally planar configuration following mirror support insertion such that the slot again narrows. The mirror support is thus securely engaged by the aperture for maintaining the sun screen disposed over and in close proximity to the inner surface of the windshield. The sun screen is preferably comprised of a lightweight, opaque, semi-rigid material such as cardboard.

22 Claims, 2 Drawing Sheets

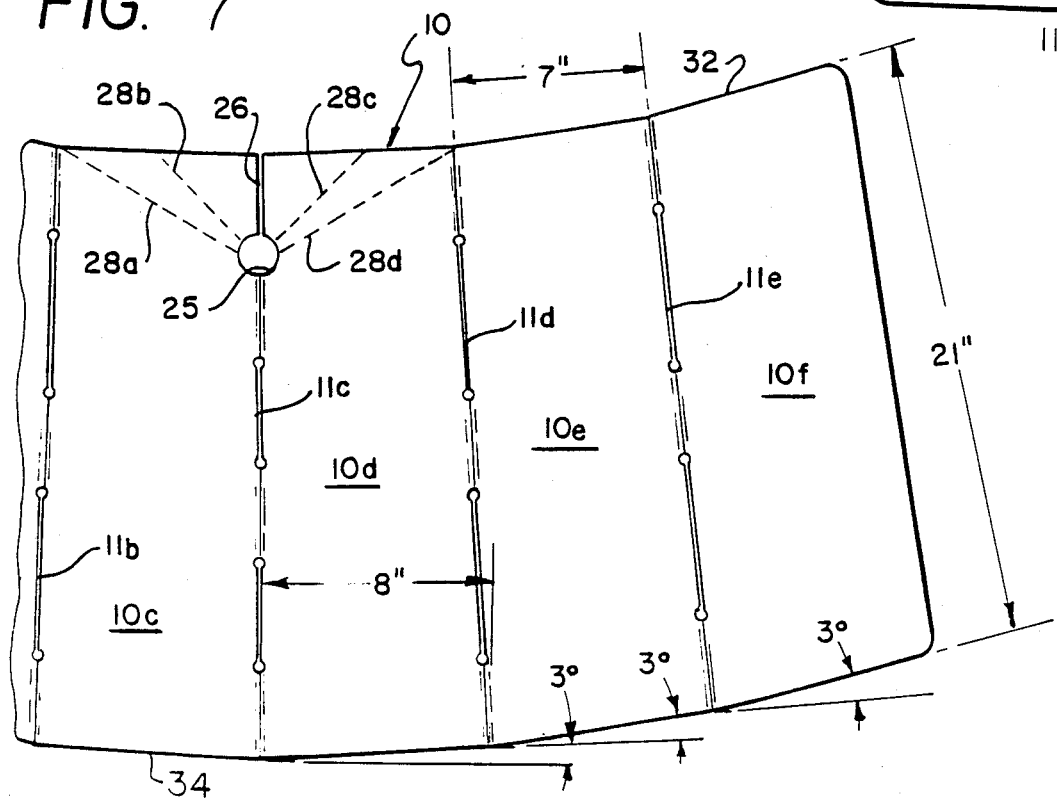

SUN SCREEN FOR VEHICLE

BACKGROUND OF THE INVENTION

This invention relates generally to a device for shading the interior of a vehicle and is particularly directed to a sun shield which can be easily and securely positioned adjacent to the inner surface of a windshield of a motor vehicle.

Early approaches to limiting sunlight to the interior of a motor vehicle involved the use of a sun screen positioned either outside of or within the vehicle. As used herein, the terms "sun screen", "sunshield" and "sunshade" are considered to be equivalent and to have the same meaning. The exterior sun screen was mounted to the motor vehicle immediately forward of and above the windshield. Interior sun screens were generally of the venetian blind or louvre type disposed adjacent to either the rear or side windows. These latter sun screens could be either opened or closed by pivoting displacement of the individual slats depending upon the sunlight level and whether or not the vehicle was being operated.

More recent vehicular sun screens are intended for use only when the vehicle is not in operation and are positioned over either the back window or, more commonly, the forward windshield of the vehicle. These latter sun screens are not intended to improve the vision of an operator or passenger in bright sunlight, but rather to protect the interior of the vehicle from excessive glare and high temperatures associated with bright sunlight. These more recent sun screens typically include a plurality of generally planar sections coupled together in a folding manner to permit the sun screen to be either folded into a compact structure or unfolded to form a generally flat structure extending substantially over the entire inner surface of the windshield (or back window). An example of this approach is disclosed in U.S. Pat. No. 4,202,396 to Levy wherein a plurality of planar rectangular elements joined along their longitudinal edges are adapted for unfolding and positioning across the vehicle's windshield. Support for maintaining the sunshield in position is provided either by the vehicle's sun visors disposed in an extended, lowered position, by the vehicle's rearview mirror, or by the vehicle's steering wheel. In the case of support provided by the rearview mirror, an upper, center portion of the sunshield includes a foldable flap which can be pivotally displaced to permit the sunshield to be positioned above and forward of the rearview mirror and which then can be repositioned in the plane of the sunshield so as to engage the rearview mirror and maintain the sunshield in position in closely spaced, parallel relation to the windshield. In this approach, the rectangular shape of the individual sunshield sections limits the conformance of the sunshield to the curved, upwardly tapered shape of the windshield and results in uncovered portions of the windshield and exposure of the vehicle's interior to rays of sunlight. In addition, the folding flap arrangement affords only limited engagement with the rearview mirror resulting in unstable positioning of the sunshield. Moreover, in some cases particularly where the rearview mirror is mounted directly to the windshield as in most current installations, this approach does not afford any contact of the sunshield with the rearview mirror and thus provides no support for the sunshield.

The present invention overcomes the aforementioned limitations of the prior art by providing a sun screen for a vehicle, such as a motor vehicle, a boat, etc., which is adapted for secure, closely spaced positioning to the vehicle's windshield by engaging a rearview mirror support member disposed adjacent thereto. The sun screen is inexpensive, easily positioned and removed from adjacent to the vehicle's windshield, and is securely maintained in position once installed.

OBJECTS AND SUMMARY OF THE INVENTION

Accordingly, it is an object of the present invention to shield the interior of a motor vehicle from bright sunlight.

It is another object of the present invention to provide a sun screen for the windshield of a motor vehicle which is inexpensive, easily installed and removed, and remains securely in position once installed.

Yet another object of the present invention is to provide a removable sunlight shield for the windshield of a motor vehicle which makes use of existing hardware within the vehicle for maintaining itself securely in position in closely spaced relation to the windshield's inner surface.

A further object of the present invention is to provide a sunshade for a vehicle adapted for engagement with and suspension from the vehicle's rearview mirror in a securely mounted, easily removable arrangement.

This invention contemplates a sun screen for a windshield of a vehicle having a rearview mirror disposed adjacent to and aft of the windshield, the sun screen comprising: a plurality of planar sections hingedly coupled together along adjacent edges thereof, wherein each of the planar sections is in the general form of a trapezoid tapered toward an upper edge thereof and wherein the sun screen may either be extended to a generally planar configuration or folded into a compact configuration; engaging means disposed in an upper, center portion of the sun screen and including an aperture coupled to an upper edge of the sun screen via an elongated linear slot, wherein the aperture is adapted for receiving and engaging a rearview mirror support element disposed adjacent to the windshield; and a flexible portion disposed about the aperture and adjacent to the slot to facilitate insertion of the mirror support into and its removal from the aperture.

BRIEF DESCRIPTION OF THE DRAWINGS

The appended claims set forth those novel feature which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4 is a sectional view of the portion of the sun screen illustrated in FIG. 3 taken along sight line 4—4 therein;

FIG. 5 is a lateral sectional view illustrating details of the manner in which the sun screen is maintained in position in the vehicle;

FIG. 6 is a perspective view of the sun screen of the present invention shown in the folded configuration; and FIG. 7 is a plan view of a portion of the sun screen illustrating additional details of the invention.

DESCRIPTION OF THE PREFERRED EMBODIMENT

Figure 1:
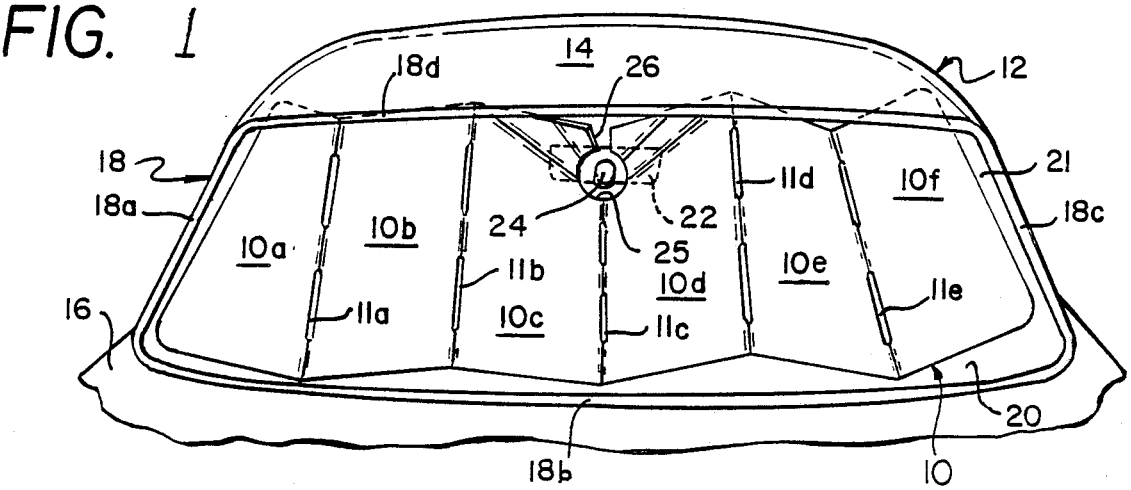
FIG. 1 is a front elevation view of a sun screen in position adjacent to the windshield of a motor vehicle in accordance with the principles of the present invention.

Referring to FIG. 1, there is shown a front elevation view of a sun screen 10 in accordance with the present invention positioned aft of and adjacent to the windshield 20 of a motor vehicle 12. The motor vehicle 12 may be an automobile, a truck, a motorboat or virtually any vehicle having a glass windshield and a rearview mirror 22 disposed adjacent thereto. The sun screen 10 is preferably comprised of cardboard, but may be fabricated from any of the more common lightweight, semi-rigid materials well known to those skilled in the art. In addition, the sun screen 10 is preferably comprised of an opaque material, but may also be comprised of a material which does not completely block light but transmits light of a reduced intensity.

The motor vehicle 12 includes a roof 14, a front hood 16 and a glass windshield 21 disposed therebetween. The glass windshield 21 is maintained in position between the roof 14 and the hood 16 by means of a window frame 18. The window frame 18 includes first and second side members 18a, 18c as well as bottom and top members 18b and 18d. When viewed from the front, the aforementioned side, bottom and top frame members form a generally rectangular structure, although in most installations the bottom and top members 18b, 18d are generally curved rearward from the center of the windshield 21. Thus, the top member 18d is shorter than the bottom member 18b because of the curvilinear shape of the glass windshield 21 and its inclined orientation, with its upper portion positioned aft of its lower portion.

A mirror support 24 is securely attached to an upper center portion of the windshield 21 and extends rearward therefrom. A rearview mirror 22 is attached to the distal end of the mirror support 24 as shown in FIG. 1 and particularly in the lateral sectional view of FIG. 5. Although the mirror support 24 is shown in the various figures as being mounted to the windshield 21, the present invention is not limited to this arrangement and may be used where the mirror support is attached to another portion of the vehicle provided it is positioned adjacent to an upper, center portion of the vehicle windshield. Disposed immediately aft of and adjacent to the bottom window frame member 18b in a conventional manner is a dashboard 20. A lower edge of the sun screen 10 is positioned upon and supported by the dashboard 20 when the sun screen is in position in the vehicle 12.

Figure 2:
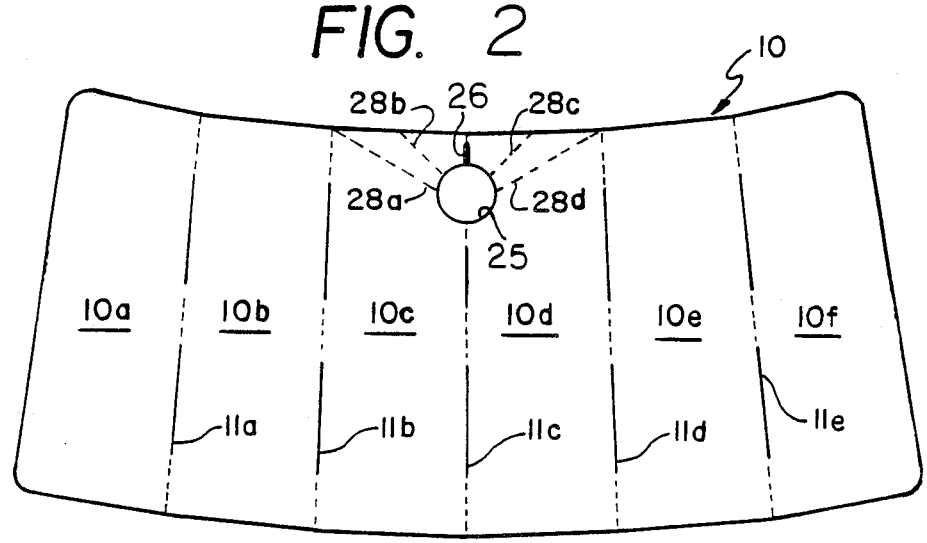
FIG. 2 is a plan view of the sun screen of the present invention shown in the fully extended, flat configuration.

As shown in FIG. 1, where the sun screen 10 is illustrated in a nearly fully extended, or unfolded, configuration as well as in the plan view of FIG. 2 wherein the sun screen is shown in the fully unfolded, or flat, configuration, the sun screen is comprised of a plurality of generally planar sections 10a through 10f. Disposed between and connecting adjacent sun screen sections is a hinge member comprised of an elongated, linear array of perforations in a preferred embodiment. Thus, a first perforated hinge 11a pivotally couples first and second sections 10a, 10b. A second perforated hinge 11b pivotally couples second and third sun screen sections 10b and 10c. A third perforated hinge 11c pivotally couples third and fourth sections 10c and 10d, etc. Each of the perforated hinges allows for pivoting displacement of adjacent sun screen sections relative to each other permitting the sun screen 10 to be folded into a compact configuration as shown in FIG. 6. Hinge arrangements other than those comprised of a series of perforations are available and well known to those skilled in the art and the present invention is intended to include these alternative hinge arrangements. For example, the hinges may be comprised of strips of a yieldable material such as plastic, leather or cloth and may be formed with an adhesive, staples, thread or pins.

Figure 3:
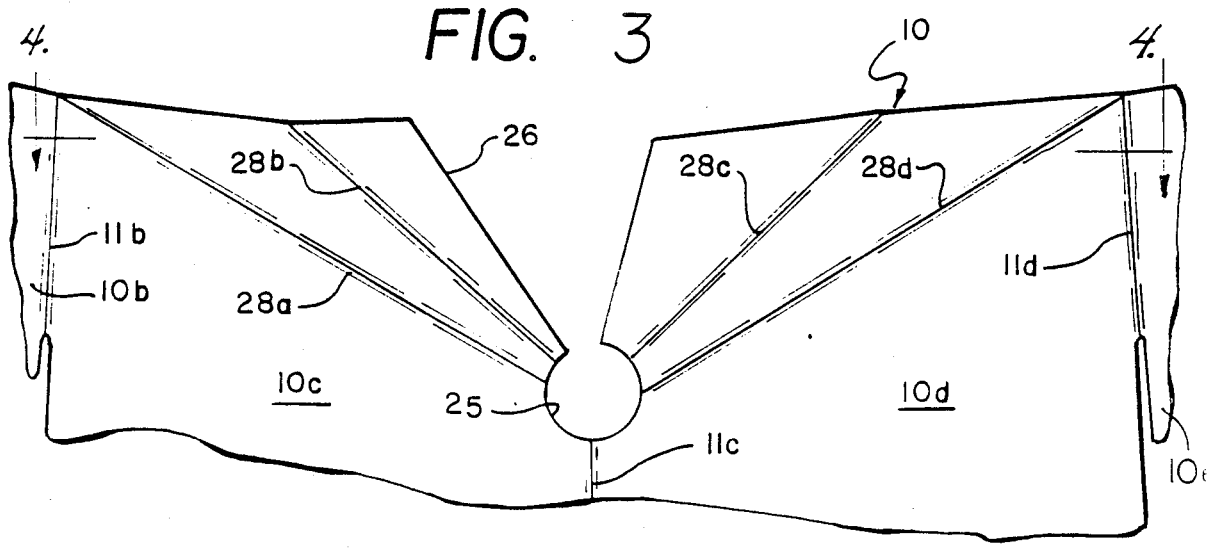
FIG. 3 is a partial plan view of the sun screen shown in FIGS. 1 and 2 illustrating details of the rearview mirror engaging portion thereof.

An upper, center portion of the sun screen 10 is provided with the combination of a linear, elongated slot 26 and an aperture 25. As shown in FIG. 2 and an enlarged view of this portion of the sun screen 10 illustrated in FIG. 3, the aperture 25 is generally circular in a preferred embodiment, although it is not limited to this shape. Disposed about an upper portion of the aperture 25 and extending therefrom outward to the upper edge of the sun screen 10 are a plurality of spaced linear arrays of perforations 28a through 28d. Where the aperture 25 is circular, the arrays of perforations 28a-28d extend outward radially from the aperture toward the upper edge of the sun screen 10. Each of the aforementioned arrays of perforations 28a-28d provides flexibility in the upper, center portion of the sun screen 10 shown in FIG. 3. In FIG. 3, adjacent portions of the sun screen 10 on opposite sides of the slot 26 have been displaced relative to one another and out of the plane of the sun screen. Thus, the slit 26 is shown enlarged and extending from the upper edge of the sun screen 10 to the aperture 25. The slot 26 as well as the aperture 25 are in alignment with the third, or center, perforated hinge 11c. Each of the arrays of perforations 28a-28d permits the slot 26 to be made larger by flexing adjacent portions of the sun screen 10 along the aforementioned arrays of perforations.

Referring to FIG. 4, which is a sectional view of the sun screen 10 as shown in FIG. 3 taken along sight line 4—4 therein, flexure of the upper, center portion of the sun screen adjacent to the combination slot 26 and aperture 25 is made possible by the arrays of perforations 28a-28d. When the upper, center portion of the sun screen 10 is displaced either forward or aft out of the general flat plane of the sun screen, the slot 26 widens allowing an element to be inserted in the aperture 25. When the sun screen 10 is no longer flexed and is allowed to assume its generally planar, extended configuration, an element positioned within the aperture 25 will be securely retained therein since the facing edges defining the slot 26 will be in closely spaced relation. The latter condition is shown in the plan view of FIG. 2, wherein the upper, center portion of the sun screen 10 is not flexed, or displaced, relative to the plane of the sun screen.

Referring to FIG. 5, there is shown a lateral sectional view of the sun screen 10 taken along the third, or middle, perforated hinge 11c and through the aperture 25 and slot 26. Forward or aft flexure of the sun screen 10 adjacent to the aperture 25 therein increases the width of slot 26, as previously described, allowing the mirror support 24 to be inserted through the slot and into the sun screen's aperture. Allowing the sun screen to assume its generally planar configuration, places an upper portion of the aperture 25 in contact with the mirror support 24 to maintain the sun screen in position adjacent to the vehicle's windshield 21.

As shown in FIG. 6, the sun screen 10 may be folded in an accordion-like manner to form a compact structure. The sun screen 10 is easily folded along each of the aforementioned perforated hinges, with only the fifth perforated hinge 11e labeled in the figure. The thus folded sun screen 10 may be maintained in this compact configuration by means of a retaining strap 30 disposed thereabout. Retaining strap 30 may be comprised of any of the more conventional elastic materials for ease of fitting around the sun screen 10 and may take the form of a rubber band. When folded, the sun screen 10 assumes a generally trapezoidal shape because of the configuration of its individual sections.

The trapezoidal shapes of each of the sections 10a–10f provide the sun screen 10, when laid flat, with nonlinear upper and lower edges 32 and 34, as shown in the plan view of FIG. 7. As shown in the figure, the edges of adjacent sections of the sun screen 10 form 3° angles relative to one another. Also from the figure it can be seen that a preferred embodiment of the sun screen for use in a conventionally sized automobile includes individual sections which are on the order of 7 inches wide at the top and 8 inches wide at the bottom, with each of the sections having a length on the order of 21 inches. As described above, it is the tapered shape of each of the sections of the sun screen 10 which causes it to have curvilinear upper and lower edges when laid flat. The upper and lower curvilinear edges 32, 34 of the sun screen 10 allow it to conform to the curved shape of the typical automobile windshield when installed adjacent thereto.

There has thus been shown a sun screen for a motor vehicle which includes an improved support arrangement for maintaining the sun screen in closely spaced position relative to the vehicle's windshield. The sun screen includes a plurality of pivotally coupled opaque trapezoidal-shaped sections to allow it to be folded into a compact structure or to be extended to a generally flat, or slightly curved, configuration conforming closely to the shape of the windshield. The sun screen includes a slot and aperture support arrangement at its upper, center portion to permit the sun screen to be easily attached to and removed from a rearview mirror support positioned adjacent to the windshield, while maintaining the sun screen securely in position when installed.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A sun screen for a windshield of a vehicle having a rearview mirror disposed adjacent to and aft of the windshield, said sun screen comprising:

a plurality of planar sections hingedly coupled together along adjacent edges thereof, wherein each of said planar sections is in the general form of a trapezoid tapered toward an upper edge thereof and wherein the sun screen may either be extended to a generally planar configuration or folded into a compact configuration;

engaging means disposed in an upper, center portion of the sun screen when extended and including an aperture coupled to an upper edge of the sun screen via an elongated linear slot, wherein said aperture is wider than said slot and is adapted for receiving and engaging a rearview mirror support element disposed adjacent to the windshield; and a flexible portion disposed about said aperture and adjacent to said slot to facilitate insertion of said mirror support into and its removal from said aperture.

2. The sun screen of claim 1 further comprising a plurality of spaced elongated, linear, flexible connections disposed between and hingedly coupling adjacent sections of the sun screen.

3. The sun screen of claim 2 wherein each of said elongated, linear, flexible connections includes a plurality of perforations in the sun screen.

4. The sun screen of claim 2 wherein said slot and aperture are disposed on a center one of said elongated, linear, flexible connections adjacent to the upper edge of the sun screen.

5. The sun screen of claim 1 wherein said aperture is generally circular and includes an open upper portion defined by said slot.

6. The sun screen of claim 5 wherein said flexible portion includes a plurality of spaced linear, flexible connections.

7. The sun screen of claim 6 wherein each of said spaced linear, flexible connections is comprised of an array of perforations in the sun screen.

8. The sun screen of claim 7 wherein each array of perforations is disposed radially about an upper portion of said circular aperture.

9. The sun screen of claim 8 wherein each array of perforations includes a first end disposed adjacent to said circular aperture and a second end disposed adjacent to an upper edge of the sun screen.

10. The sun screen of claim 1 wherein said mirror support is mounted to the windshield.

11. The sun screen of claim 10 wherein said mirror support includes a first proximal end attached to said windshield and a second distal end attached to said mirror.

12. The sun screen of claim 1 wherein said sun screen further includes a lower edge, and wherein said lower edge is longer than the upper edge of the sun screen.

13. The sun screen of claim 12 wherein the vehicle further includes a dashboard disposed adjacent to and aft of a lower portion of the windshield, and wherein the lower edge of the sun screen is disposed upon and in contact with said dashboard.

14. The sun screen of claim 1 wherein the vehicle further includes a frame having curved upper and lower edges and linear first and second lateral edges disposed about and in contact with the windshield, and wherein said lower frame edge is longer than said upper frame edge and said lateral frame edges are disposed adjacent and generally parallel to respective lateral edges of the sun screen.

15. The sun screen of claim 1 wherein each section of the sun screen includes linear upper and lower edges and wherein the upper and lower edges of the sun screen are generally curved when the sun screen is extended and installed in a vehicle.

16. The sun screen of claim 1 further comprising retaining means disposed about the sun screen when folded to maintain the sun screen in a compact configuration.

17. The sun screen of claim 16 wherein said retainer means comprises an elastic strap disposed about the sun screen.

18. The sun screen of claim 17 wherein said elastic strap is a rubber band.

19. The sun screen of claim 1 wherein the sun screen is comprised of an opaque material.

20. The sun screen of claim 19 wherein the sun screen is comprised of cardboard.

21. A foldable sun screen for a windshield of a vehicle having a rearview mirror disposed adjacent to and aft of the windshield, said sun screen comprising:

a plurality of planar sections hingedly coupled together along adjacent edges thereof, wherein each of said planar sections is in the general form of a trapezoid tapered toward an upper edge thereof;

engaging means disposed in an upper, center portion of the sun screen when unfolded and including an aperture coupled to an upper edge of the sun screen via a slot, wherein said aperture is wider than said slot and is adapted for receiving and engaging a rearview mirror support element disposed adjacent to the windshield; and a flexible portion disposed about said aperture and adjacent to said slot to facilitate insertion of said mirror support into and its removal from said aperture via said slot.

22. A foldable sun screen for a curvilinear, rearwardly angled windshield of a vehicle having a rearview mirror disposed adjacent to and aft of the windshield, said sun screen comprising:

a plurality of planar opaque sections hingedly coupled together along adjacent edges thereof, wherein each of said planar sections is in the general form of a trapezoid tapered toward an upper edge thereof and having parallel upper and lower edges, and wherein the sun screen may either be folded into a compact, non-use configuration or extended to a curvilinear configuration having similarly curved upper and lower edges to permit the sun screen to conform to the shape of the windshield and allow for closely spaced, parallel positioning between the sun screen and the windshield;

engaging means disposed in an upper, center portion of the sun screen when extended and including an aperture coupled to an upper edge of the sun screen via a slot, wherein said aperture is wider than said slot and is adapted for receiving and engaging a rearview mirror support element disposed adjacent to the windshield; and a flexible portion disposed about said aperture and adjacent to said slot to facilitate insertion of said mirror support into and its removal from said aperture.

* * * * *